Figure 1:
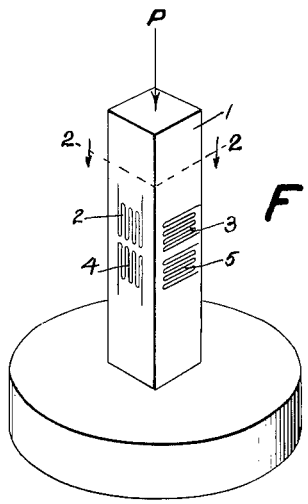

Feb. 15, 1966  A. C. RUGE  3,234,787
STRAIN GAGE TRANSDUCER WITH IMPEDANCE MEANS FOR
COMPENSATING FOR THE CHARACTERISTIC
NONLINEARITY OF THE GAGE

Filed April 14, 1961  3 Sheets-Sheet 1

INVENTOR.
Arthur C. Ruge
BY
Attorney

Feb. 15, 1966 A. C. RUGE 3,234,787
STRAIN GAGE TRANSDUCER WITH IMPEDANCE MEANS FOR
COMPENSATING FOR THE CHARACTERISTIC
NONLINEARITY OF THE GAGE
Filed April 14, 1961 3 Sheets-Sheet 2
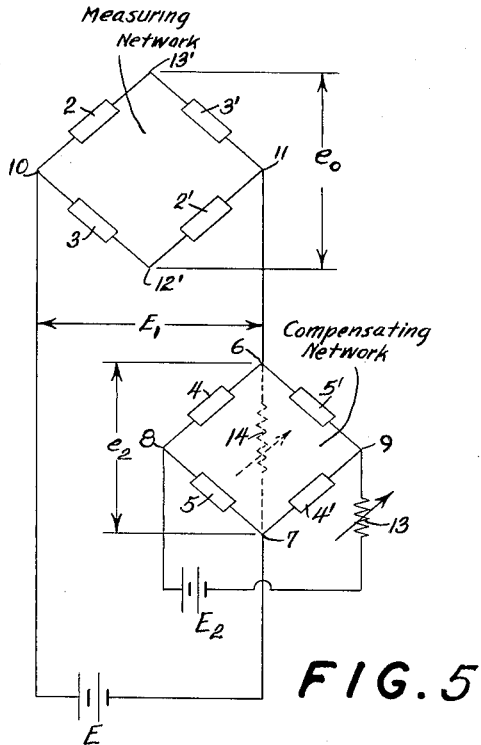
FIG. 5
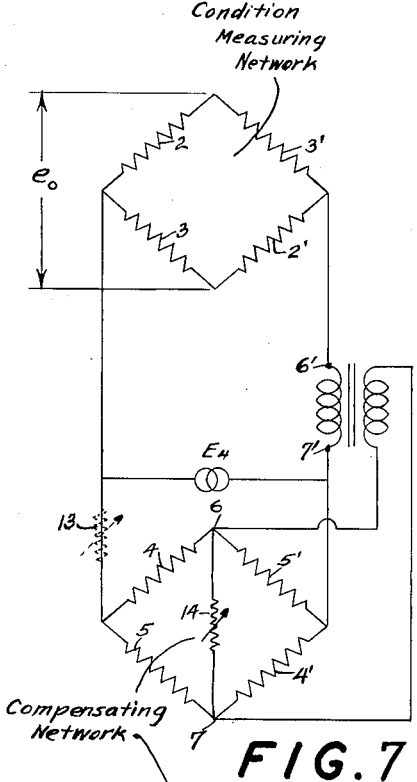
FIG. 7
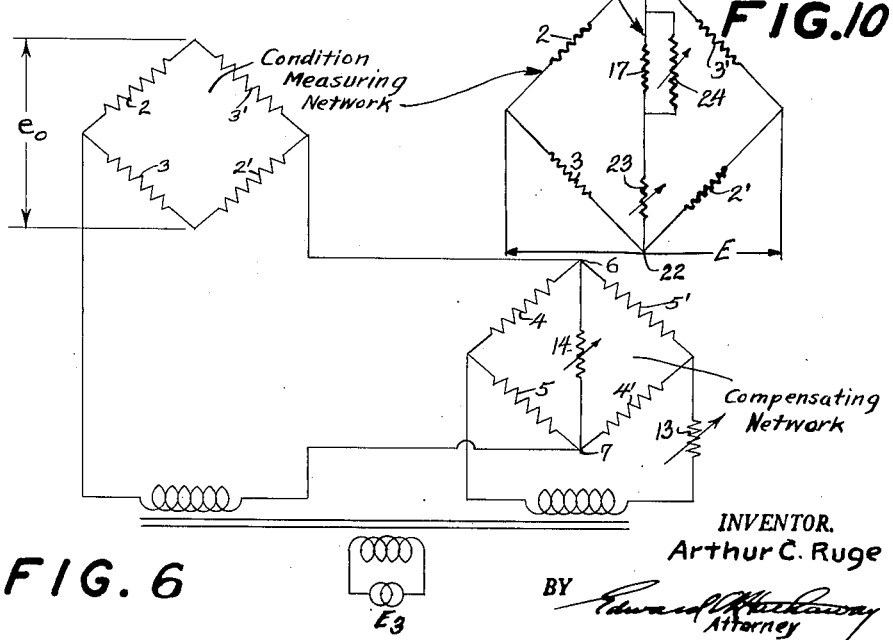
FIG. 6
FIG. 10
INVENTOR.
Arthur C. Ruge
BY
Attorney Feb. 15, 1966
A. C. RUGE
3,234,787
STRAIN GAGE TRANSDUCER WITH IMPEDANCE MEANS FOR
COMPENSATING FOR THE CHARACTERISTIC
NONLINEARITY OF THE GAGE
Filed April 14, 1961
3 Sheets-Sheet 3

INVENTOR.
Arthur C. Ruge
BY
Attorney

United States Patent Office 3,234,787
Patented Feb. 15, 1966

3,234,787
STRAIN GAGE TRANSDUCER WITH IMPEDANCE MEANS FOR COMPENSATING FOR THE CHARACTERISTIC NONLINEARITY OF THE GAGE
Arthur C. Ruge, Lexington, Mass., assignor to Baldwin-Lima-Hamilton Corporation, a corporation of Pennsylvania
Filed Apr. 14, 1961, Ser. No. 115,837
9 Claims. (Cl. 73—141)

This invention relates to means for compensating for a chaarcteristic type of nonlinearity of a transducer in which an electrical impedance varies in response to the condition to be measured. Such non-linearity is normally in the nature of a parabolic or near-parabolic deviation from the tangent to the output curve at some reference point.

It is an object of the present invention to provide economical and convenient means for obtaining a desired degree of compensation for such nonlinearity in a transducer by employing an additional condition-responsive element in such a manner as to cause the condition-responsive output of the transducer to vary as a desired function of the magnitude of the condition itself.

A further object is to provide means whereby a desired value of such compensation can be obtained after the transducer has been completed to the point where its condition-responsive output characteristics can be measured.

It is also an object of the invention to provide convenient means for deliberately introducing such a characteristic nonlinearity into the output of any condition-responsive network in which an electrical impedance element varies in response to the condition to be measured, regardless of whether or not inherent nonlinearity was present before. Also, a further purpose is to provide convenient means for varying the sign and magnitude of such introduced nonlinearity after the network has reached a state of completion where its condition-responsive output characteristics can be measured.

Another object is to provide means for compensating for the characteristic nonlinearity of a semiconductor strain gage type of transducer due to the inherent nonlinear resistance vs. strain relationship in such gages. For this I preferably employ one condition-responsive semiconductor gage to compensate for the nonlinearity of another condition-responsive semiconductor gage. A further object is to make it easy and economical to obtain the degree of such compensation after the transducer is substantially complete, so that relatively large normal variations in inherent nonlinearity can be easily compensated out.

A still further object of my invention is to provide for highly precise nonlinearity compensation in the case of a transducer in which the nonlinear deviation from a tangent at a point of reference differs somewhat from a true parabolic deviation. In particular, I provide means to compensate for the type of nonlinearity characteristic of a strain gage transducer for load in which the load range includes tension and compression, or a large range of either, wherein the nonlinearity deviates somewhat from a parabolic law due to the presence of third and higher degree terms.

Figure 2:
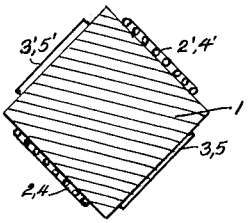
Figure 9:
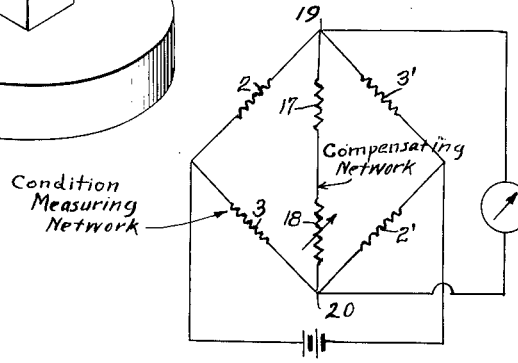
Figures 3, 4:
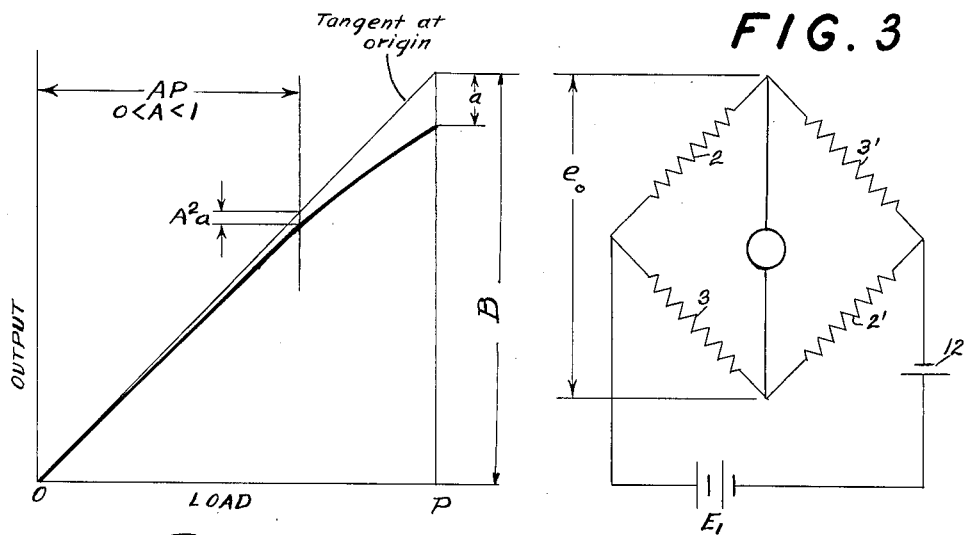
Figure 11:
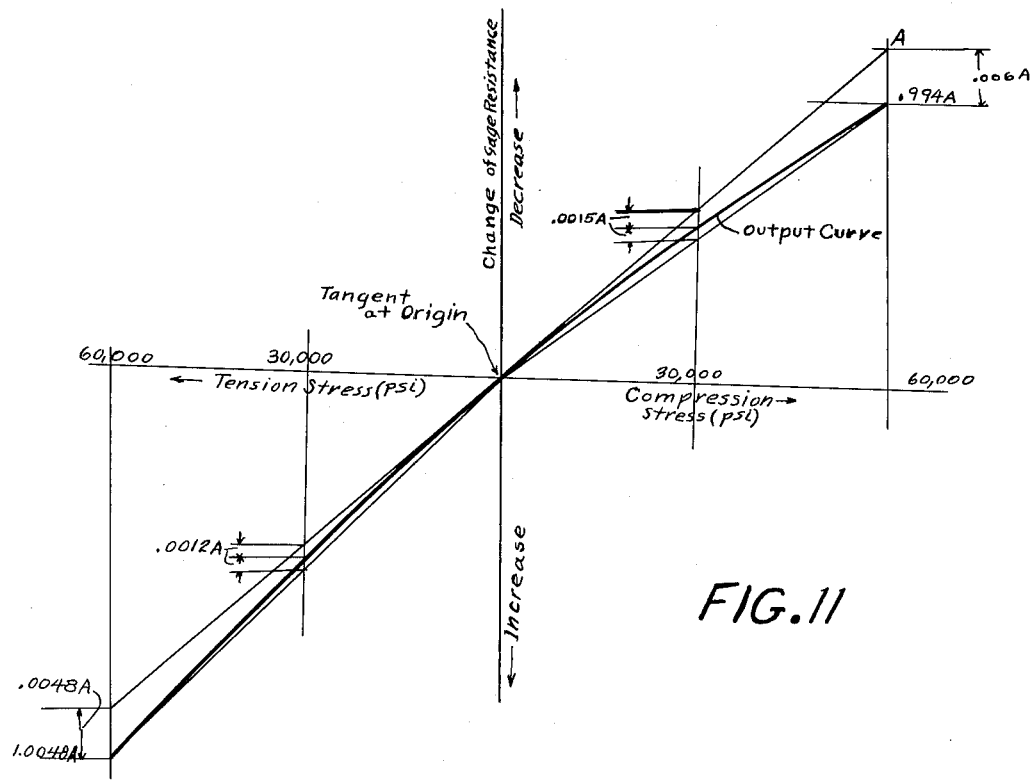
Figure 8:
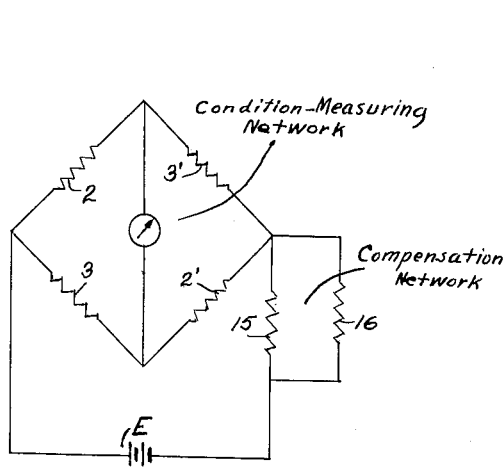
Figure 12:
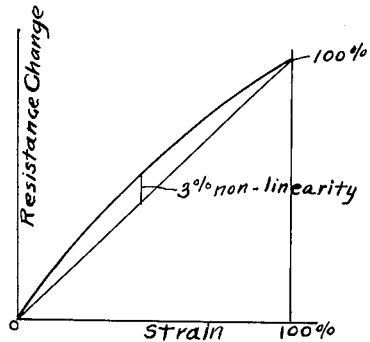

Other objects and advantages wil lbe more apparent to those skilled in the art from the following description of the accompanying drawings in which:

FIG. 1 is a perspective of a load transducer strain-sensitive column:
FIG. 2 is a sectional view taken on line 2—2 of FIG. 1;
FIG. 3 is a schematic diagram of a transducer network to explain the principle of my invention;
FIG. 4 is a diagram illustrating typical compression load transducer nonlinearity;
FIGS. 5, 6, and 7 illustrate embodiments in which a condition-responsive impedance bridge is employed as the compensating network;
FIG. 8 illustrates an embodiment in which the compensating network comprises a condition-responsive shunted impedance element in series with the power source;
FIGS. 9 and 10 are embodiments in which the compensating network is connected across the output terminals and includes a condition-responsive impedance element;
FIG. 11 illustrates typical load transducer nonlinearity for both tension and compression load; and
FIG. 12 illustrates a definition of nonlinearity.

FIG. 1 shows, by way of example to illustrate my improved principle, a load column 1 subject to an axial load P. The column for convenience is made square and on the faces are attached a number of strain sensitive electrical gages 2, 2', 4 and 4' adapted to measure longitudinal strain and 3, 3', 5, 5' adapted to measure lateral strain, the arrangements being evident from examination of FIGS. 1 and 2. If a set of these strain gages 2, 2', 3, 3' is arranged in a simple bridge circuit as that shown in FIG. 3 the output as a function of load will be non-linear as illustrated in exaggerated form in FIG. 4. The deviation of the output curve from the tangent at the origin is in practice substantially parabolic. As explained in my Patent No. 2,771,579, if I can contrive to add to the voltage $E_1$ acting on the bridge of FIG. 3 another voltage 12 which is proportional to the load P acting on the load cell, then the bridge output $e_o$ can be made linear by proper choice of the proportionality constant between voltage 12 and load P. Or, I can deliberately produce a nonlinear output in a bridge circuit by the same means.

In FIG. 5 I show an embodiment of the present invention which makes it possible to achieve the result without requiring any mechanically moving parts or electronic or other amplifying means. The load measuring bridge 2, 2', 3, 3' is powered by a voltage source E acting in series with a compensating bridge 4, 4', 5, 5' so that the voltage appearing across the input terminals 10, 11, is $E_1$. The output voltage across terminals 12', 13' is $e_o$. The compensating bridge has voltage $E_2$ applied across its input terminals 8, 9, and its output terminals 6, 7 are connected in series with battery E and the load measuring bridge. While I have here shown in FIG. 5 a load measuring bridge and a compensating bridge each arm of which is comprised of a strain gage responsive to the condition to be measured, it is to be understood that this is merely a preferred form of the invention which has the desired features of maximum response to the condition and inherent temperature compensation. It is readily seen that only one filament in each bridge network such as 2 and 4 would suffice to make the device operative, the other elements being made up of other suitable electrical impedances. Also, it is to be noted that I can vary the degree or amount of compensation by regulating the voltage appearing across compensating bridge terminals 8, 9 by any of the well known means such as rheostat control 13 or by applying a shunt 14 across output terminals 6, 7 or by merely selecting the desired ratio between voltages $E_2$ and E. Furthermore, by reversing the polarity of the voltage $E_2$ relative to E, I can reverse the direction or sign of the compensation.

All of the generalizations contained in my said patent apply here also. For example, FIG. 6 shows how the two responsive means can be fed from a single A.C. voltage source $E_3$, with output terminals 6, 7 of the compensating network being connected in series with the input terminals of the condition measuring network. Alternatively, FIG. 7 shows how the two responsive networks can be fed directly from a single A.C. voltage source $E_4$ with terminal 6, 7 of the compensating network being transformer coupled to output terminal 6', 7' which are connected in series with the condition measuring network.

A special and more limited case of the FIG. 5 embodiment of the present invention is shown in FIG. 8 where the auxiliary battery $E_2$ of FIG. 5 is omitted and a single condition responsive impedance element 15 is substituted for the bridge 4, 4', 5, 5' of FIG. 5. A shunting impedance 16, which may be adjustable if desired, performs the function of element 13 or 14 of FIG. 5 in adjusting the magnitude of the nonlinearity compensating means to the desired degree of precision.

Element 15 might, for example, be a strain gage such as 4 or 5 of FIG. 1, depending upon the magnitude and/or direction of compensation desired. As an example, to fix the magnitude that might be involved in a practical situation, assume a column-type load transducer as in FIG. 1 the open circuit output of the condition measuring network (FIG. 8) being two millivolts per volt of the exciting voltage E at full scale and the nonlinearity "$a$" of FIG. 4 being (.006)B. For element 15 we may choose a semiconductor strain gage (corresponding to element 4 of FIG. 1) having a resistance of one-tenth of that of bridge arm 2 and 3 and having a strain sensitivity or "gage factor" of +60 which is easily obtainable in practice. Assume that at full load on the column of FIG. 1 the axial strain in column 1 is two parts per thousand. The condition to be met in FIG. 8 is simply that the condition response of element 15 with shunt 16 removed produces too great a compensating nonlinearity so that by selecting the magnitude of shunt 16 I can introduce a nonlinearity at full scale of (.006)B or 6/10% of the full scale output of the condition measuring network. The correct value for shunt 16 turns out to be approximately 4.73 times the resistance of element 15.

Thus it may be seen that this embodiment of my present invention lends itself to practical application with such transducers as that illustrated in FIG. 1. This would also hold true for transducers such as torquemeters and fluid pressure cells of conventional resistance strain gage types which may have nonlinearities of about the same order of magnitude. From the standpoint of practical manufacturing, the ability to select or adjust shunt 16 after the transducer is substantially completed is a very important advantage. No matter how carefully the components and the steps of manufacturing are controlled, there will always be a certain amount of variability in the magnitude of the nonlinearity of the transducers manufactured in a given lot. Where a high degree of final linearity is required it is necessary therefore to individually select the resistance of shunting element 16 to optimize the compensation for nonlinearity.

For the sake of symmetry, element 15 would in many cases be replaced by two symmetrical elements connected to opposite input corners of the bridge network. Also worthy of note, this method lends itself to correcting for nonlinearity of either algebraic sign since strain gages represented by element 15 can be obtained with either positive or negative gage factor, a wide range of numerical magnitude being available, particularly among the semiconductor strain gages. Also, in the illustrative example given above, instead of using a gage element 4 of FIG. 1 to make up element 15 of FIG. 8, it would have been equally practical to use a gage element 5 of FIG. 1 having a negative gage factor and having a suitable resistance.

In another embodiment of the present invention, the desired nonlinearity compensation is achieved by employing a strain gage such as 4 or 5 of FIG. 1 as a shunt across the output terminals of the bridge FIG. 3. Thus, for the sake of illustration, assume a column type load cell and assume gage 4 of FIG. 1 has a negative gage factor. If gage 4 is connected across the output terminals of the bridge of FIG. 3 it may be seen that application of load P to column 1 of FIG. 1 results in a corresponding increase of the shunting resistance of gage 4 across the output terminals of the bridge, thus tending to offset the droop "$a$" of FIG. 4. Now, since it will generally be impractical to achieve perfect non-linearity compensation by selection of the resistance and gage factor of gage 4, I provide means for bringing the degree of compensation to the desired value and this means can be selected or adjusted after the transducer is substantially completed, just as was the case where a suitable compensating resistor was placed in series with the bridge input terminals. FIG. 9 shows one way in which this is accomplished. Referring to FIG. 1 as it relates to FIG. 9, strain gages 2, 3 comprise a condition-measuring network responsive to load P. Elements 17 would be a gage such as 4 or 5 of FIG. 1, either of which may have positive or negative gage factor as required by the direction of non-linearity curvature to be corrected. Element 17 is selected so that its resistance and gage factor combine to produce resistance changes in response to load P in excess of what would be needed if the element were directly shunted across output terminals 19, 20. An adjustable or selectable resistance 18 is placed in series with element 17 so that the degree of non-linearity compensation can be adjusted to any desired accuracy.

FIG. 10 shows another arrangement for accomplishing the same purpose. Here, compensating element 17 can be provided with an adjustable or selectable shunt 24 to vary the degree of its effectiveness upon the nonlinearity compensation. Also, adjustable or selectable resistance 23 may be placed in series with the just-described combination and it may have any value from zero to an arbitrarily high value. The combination is connected across output terminals 21, 22. Either or both 23 and 24 may be adjusted or selected after the transducer is substantially completed if desired.

In any or all of the embodiments of the present invention the transducer gages themselves may some or all be semiconductor gages or any other piezoresistive gages. Also, the nonlinearity compensating gage may be any kind of piezoresistive gage.

The importance of this is that my invention makes it possible to employ high-output strain gages whose strain response is too nonlinear for precision transducers because I can reduce or eliminate such nonlinearity by use of another high-output gage as a compensator, the compensating effect of which I can effect externally after the cell is substantially completed.

As an example, semiconductor strain gages now commercially available from Micro Systems, Inc. of San Gabriel, California, and from Bytrex-Kulite of Newton, Mass., exhibit nonlinearities of several percent over the range of strain commonly used in current transducer practice as illustrated in FIG. 12. The non-linearity of a typical semiconductor gage is very closely of the same general form as that described in connection with FIG. 4 for the range of strain that would normally be used in a precision transducer. But, since I can use semiconductor gages as nonlinearity compensators, I can greatly reduce the nonlinearity of the finished transducer. At first, this may seem to be a contradiction since the compensator itself would normally be nonlinear. However, if by way of example I am attempting to compensate for a 3% nonlinearity (FIG. 12) in the transducer gages by employing a compensating gage which is also 3% off linear, the net error in the compensation would be only 3% of 3% or .09%. The "reduction factor" in nonlinearity would thus be about 30, a very significant improvement. Now there is a further important refinement made possible by my present invention. Due to the fact that a given compensator such as 15 in FIG. 8 will normally be somewhat temperature-sensitive, it will be found that in general a substantially perfect nonlinearity compensation at one temperature will not hold exactly true at some other temperature. This element 15 not only can have a significant thermal coefficient of electrical resistance, but it can also vary in its electrical response to a given strain at different temperatures, with the result that its linearizing effect varies somewhat with temperature. To give an idea of the magnitudes that may be involved, in one load transducer, I have "linearized" by the teachings of the present invention I found that, while the maximum deviation from perfect linearity at 80° F. was considerably less than .01% of full scale output, the maximum deviation at 130° F. and 30° F. was plus and minus .025%, respectively. For work of highest accuracy even this small variation is undesirable.

To correct for such a situation, I give to shunt 16 of FIG. 8 a predetermined thermal coefficient of electrical resistance of such sign and magnitude as to substantially eliminate the residual nonlinearity resulting from the above-described effects of temperature. The shunt 16 (or the temperature-sensitive portion of it) is located so as to be at substantially the same temperature as the gage portion of the transducer. Since this is a secondary correction it is not necessary to hold the thermal coefficient of 16 at a precise value or even to keep it at exactly the same temperature as the transducer gages.

In the case of FIG. 5 I can get such secondary correction by making element 14 and/or 13 temperature-sensitive resistors of proper sign and thermal sensitivity. The same reasoning applied to FIGS. 6 and 7 by obvious extension. In FIGS. 9 and 10 I can make any or all of elements 18, 23, 24 temperature-sensitive resistors of proper sign and thermal sensitivity.

It should be noted that along with the linearizing of a transducer must go proper "modulus compensation," since it is as important that the condition response of the transducer must not vary with temperature beyond acceptable limits as it is that its condition response be linear. This subject is fully treated in my copending application entitled, "Improved Temperature Compensation for Condition Response of a Condition-Responsive Network" filed in April of 1961, and is mentioned here only for the sake of completeness. It will be seen that if, for example, element 15 and/or 16 of FIG. 8 has an appreciable thermal coefficient of electrical resistance there will be a corresponding effect upon the "modulus compensation" of the transducer. The treatment of this and other "modulus" effects is preferably independently handled by the teaching of my copending application. These two co-pending inventions must not be confused because of certain superficial similarities—they are distinctly different and completely separate inventions and each can be used separately or in combination with the other.

A further very remarkable result in certain modifications of my present invention has to do with the behavior of paralleled resistors, one of which varies with respect to the other, as 15, 16 FIG. 8; 17, 24 FIG. 10. To be specific, consider FIG. 8 and assume that element 15 varies directly in proportion to the load acting on a column-type load cell, FIG. 1. Now, as stated in the foregoing discussion of FIG. 4, the deviation of the output curve from the tangent at the origin is in practice "substantially" parabolic. However, when measured very precisely it is found that the deviation differs slightly from a true parabola, due to the presence of small terms of third and higher degree.

FIG. 11 shows the characteristic result obtained from a column or rod-type load cell illustrated in FIGS. 1, 2, and 3 (with battery 12 omitted or shorted out), the curve showing the result of loading in both tension and compression. The strain gages 2, 2', 3, 3' are assumed to be bonded filament gages made of constantan filament for purposes of this explanation. It will be seen that in such a case the tension output 1.0048A is considerably larger than the compression output (.994A) for the same magnitude of full-scale load. This is because the deviation from the tangent at the origin is larger in compression (.006A) than in tension (.0048A) for the same full-scale load. This means that the mid-scale nonlinearities are not the same in tension and compression, being .0012A and .0015A respectively. While the difference in mid-scale nonlinearities is small (.0003A or .03% of A), nevertheless for work of highest accuracy this difference is not tolerable. Besides, it is very inconvenient to have to use one calibration, .994A, for full-scale compression, and another, 1.0048A, for full-scale tension, the difference being about 1.1%.

Now if in FIG. 8 parallel resistance of 15, 16 were to vary directly in proportion to the load on the column we could compensate either the tension arm or the compression arm of the curve of FIG. 11 to a very good degree of precision, but not both simultaneously. But the parallel resistance of 15, 16 does not vary directly in proportion to the load because of the inherent non-linearity of the parallel resistance formula $$\frac{R_{15} \times R_{16}}{R_{15} + R_{16}}$$

Analysis of this formula will show that for a given increase in $R_{15}$ the change in the parallel resistance will be smaller than the change in parallel resistance for a decrease in $R_{15}$ of the same amount. Therefore, it may be seen that by proper choice of the magnitudes of elements 15 and 16, taking into account the "gage factor" of element 15, it is possible by my invention to offset the difference between tension and compression nonlinearities of the type shown in FIG. 4.

I have found that I can readily bring the full-scale tension and compression outputs to within substantially perfect agreement, while employing perfectly practical and commercially available elements 15 and 16. If gages 2, 2', 3, 3' of FIG. 8 are each 120 ohms in resistance and have a "gage factor" of approximately 2, and if load element 1 of FIG. 1 is made of heat-treated tool steel of high quality, the results shown in FIG. 11 are typical with elements 15, 16 omitted. If element 15 is a semiconductor type strain gage having an unstrained resistance of 35 ohms, and a gage factor of 130, and element 16 is a fixed resistance of approximately 14.7 ohms, the tension and compression full-scale outputs will be made to agree within ±⅒% of their mean value. By more meticulous choice of the resistance of element 15 the two outputs may be brought to arbitrarily close agreement. And, of course, the resulting linearity over the entire range of measurement from full-scale tension to full-scale compression will be substantially perfect.

To show that this is not a critical matter which is difficult to handle, consider an extremely different selection of elements in which 15 has an unstrained resistance of 350 ohms and the same gage factor of 130. Element 16 then turns out to be about 35 ohms and the full-scale tension and compression outputs will be made to agree within ±.04% of their mean value. For most practical purposes such agreement is quite adequate, so it may be seen that I have provided a simple non-critical means for correcting the somewhat non-parabolic nonlinearity of a typical column-type load cell.

Although the above discussion was centered largely about particular load cells with specific conditions, it is to be understood that the invention has very broad application. Similar nonlinearities are encountered in many other transducers such as those used for measuring fluid pressure, torque, and acceleration. Also, the sensing element is not limited to a resistance strain gage but may be any suitable electrical impedance element, the impedance of which varies in response to the condition to be measured. Similarly, the compensating elements (as 4, 5 FIG. 1; 15 FIG. 8; 17 FIGS. 9, 10) can be any kind of suitable electrical impedance element the impedance of which varies with the condition to be measured.

In the application of the present invention the source of power fed to the network may, in general, be either D.C. or A.C. depending upon convenience. Certain specific embodiments, as FIGS. 6 and 7, are specific to A.C. power, while the remaining embodiments shown may utilize either D.C. or A.C. However, where two supply voltages are involved, as in FIGS. 5 and 6, it is essential that they be compatible. Thus, in FIG. 5, E and $E_2$ can both be D.C. supplies having proper polarities relative to each other, or they can both be A.C. supplies having proper phase relationship to each other.

It is to be understood that wherever the term "impedance" is used, it means, as is well known in the electrical art, that all impedances in any given modification are compatible with each other to produce the desired result.

It will, of course, be understood that various changes in details of construction and arrangement of parts may be made by those skilled in the art without departing from the spirit of the invention as set forth in the appended claims.

I claim:

1. Condition-responsive apparatus having its condition response varied to a desired degree as a function of the magnitude of the condition itself so as to affect the linearity of its condition response comprising, in combination, an electrical network including a first electrical impedance element whose impedance varies in accordance with the variation of the condition to be measured, said network having a pair of input and a pair of output terminals, a source of voltage impressed upon said input terminals, whereby a variation of said condition results in a corresponding variation of the voltage appearing across said output terminals, a second electrical impedance element whose impedance varies in accordance with the variation of the same condition to be measured, said second impedance element being external of said network and being connected to one of said pairs of terminals said network so that such variation in the second impedance in response to said condition effects a corresponding variation in the magnitude of the response of said network to the condition-responsive changes in the first impedance element included therein, said second element having the magnitude of its condition-responsive variation in impedance predetermined to be in excess of that required for obtaining said desired degree of variation, and means for reducing the extent to which the variation in impedance of said second impedance element effects said corresponding variation in response of said network to obtain the desired degree of variation of the condition response of said apparatus.

2. The combination set forth in claim 1 further characterized in that the last-named means comprises a substantially constant impedance element and means for connecting the same directly in parallel with said second impedance element as a shunt.

3. The combination set forth in claim 1 further characterized in that a bridge circuit is provided in which said second impedance element is included, such bridge circuit having a pair of input terminals and a pair of output terminals, a second source of voltage impressed upon said latter input terminals whereby a variation in said condition results in a corresponding variation of the voltage appearing across said latter output terminals, said latter output terminals being connected in series with the first-named source of voltage and the input terminals of said electrical network, and said second source of voltage being compatible with the first-named source of voltage and being of a magnitude relative to that of the first-named source of voltage such that said reduction of extent may be effected.

4. The combination set forth in claim 3 further characterized in that the means for reducing said extent comprises an electrical impedance element connected to said bridge circuit.

5. The combination set forth in claim 1 further characterized by a bridge circuit in which said second impedance element is included, such bridge circuit having a pair of input terminals and a pair of output terminals, said source of voltage being A.C., and the input terminals of said bridge circuit being connected in series with said source of voltage and the output terminals of said bridge circuit being connected to the primary of a transformer, the secondary of which is connected in series with said source of voltage and said input terminals of said electrical network.

6. Strain gage transducer apparatus having its response to load varied to a desired degree as a function of the magnitude of the load on a member so as to affect the linearity of its response, comprising, in combination, an electrical network including first electrical strain gage means responsive to the load on the member and exhibiting impedance which varies in accordance with variation in the load, said network having a pair of input and a pair of output terminals, a source of voltage impressed upon said input terminals, whereby a variation of the load results in a corresponding variation of the electrical signal produced at said output terminals, second electrical strain gage means responsive to the load on the same member and exhibiting impedance which varies in accordance with variation in the load, said second strain gage means being external of said network and being connected to one of said pairs of terminals of said network so that such variation in said second strain gage means in response to variation of the load effects corresponding variation in the magnitude of the response of said network to the variation in impedance of said first strain gage means in response to variation of the load, said second strain gage means having the magnitude of its impedance in response to variations of the load predetermined to be in excess of that required for obtaining the desired degree of variation of the response of the apparatus to the load, and means for reducing the extent to which the variation in impedance of said second strain gage means effects said corresponding variation in response of said network to obtain the desired degree of variation of the response of the apparatus to the load.

7. Strain gage transducer apparatus as set forth in claim 6 further characterized in that said means for reducing said extent comprises substantially constant impedance means, means connecting said impedance means in parallel with said second strain gage means as a shunt, and means connecting the parallel combination of said second strain gage means and impedance means in electrical circuit relationship with one of said pairs of terminals of said network.

8. Strain gage transducer apparatus as set forth in claim 7 further characterized in that said means for reducing said extent further includes a second substantially fixed impedance connected in series with said parallel combination, and wherein said connecting means connects the series-parallel combination of said second strain gage means and said first and second impedances across said pair of output terminals.

9. Strain gage transducer apparatus as set forth in claim 6 further characterized in that said means for reducing said extent comprises a substantially constant impedance element, and means connecting said impedance element in series with said second strain gage means and with said pair of output terminals.

References Cited by the Examiner

UNITED STATES PATENTS

| | | | |
|---|---|---|---|
| 1,379,266 | 5/1921 | Keeler | 324—62 |
| 1,681,047 | 8/1928 | Porter | 324—62 X |
| 2,173,233 | 9/1939 | Sieneweg. | |
| 2,565,922 | 8/1951 | Howard | 324—57 X |
| 2,771,579 | 11/1956 | Ruge | 324—57 X |
| 2,867,118 | 1/1959 | Cavanagh | 324—57 X |
| 3,039,050 | 6/1962 | Krohn | 324—57 |

FOREIGN PATENTS 564,411   10/1958   Canada.

WALTER L. CARLSON, *Primary Examiner.*

SAMUEL BERNSTEIN, *Examiner.*